United States Patent [19]

Eckels

[11] 4,385,771
[45] May 31, 1983

[54] ROADWORKERS SAFETY TRAILER

[76] Inventor: Robert Y. Eckels, P.O. Box 79088, Houston, Tex. 77079

[21] Appl. No.: 286,859

[22] Filed: Jul. 27, 1981

Related U.S. Application Data

[63] Continuation of Ser. No. 34,150, Apr. 26, 1979, abandoned.

[51] Int. Cl.³ .............................................. B60D 1/000
[52] U.S. Cl. .................................. 280/400; 280/482; 280/784; 40/590
[58] Field of Search ............... 280/400, 401, 402, 403, 280/404, 408, 409, 410, 425 R, 425 A, 430, 462, 467, 472, 473, 477, 482, 478 R, 478 A, 478 B, 491 R, 491 D, 784, 783; 296/37.14; 40/590

[56] References Cited

U.S. PATENT DOCUMENTS

| | | | |
|---|---|---|---|
| 3,734,540 | 5/1973 | Thiermann | 280/482 |
| 4,017,200 | 4/1977 | Woods, Jr. | 404/12 X |
| 4,060,255 | 11/1977 | Zimmerman | 280/478 R |
| 4,087,785 | 5/1978 | Dodich | 40/590 X |

FOREIGN PATENT DOCUMENTS 806760  6/1951  Fed. Rep. of Germany ...... 280/400

Primary Examiner—David M. Mitchell
Assistant Examiner—Mitchell J. Hill
Attorney, Agent, or Firm—Francis B. Francois; Francis D. Thomas, Jr.

[57] ABSTRACT

A safety trailer for shielding in road workers from flowing traffic includes a wheeled semi-trailer with a long draught bar attached to one side of the trailer and arranged for attachment to one side of the towing vehicle, providing a work area between the trailer and the tow vehicle secure from flowing vehicular traffic, and self-contained safety mounted emergency or warning lights are mounted on the trailer for safety.

3 Claims, 4 Drawing Figures

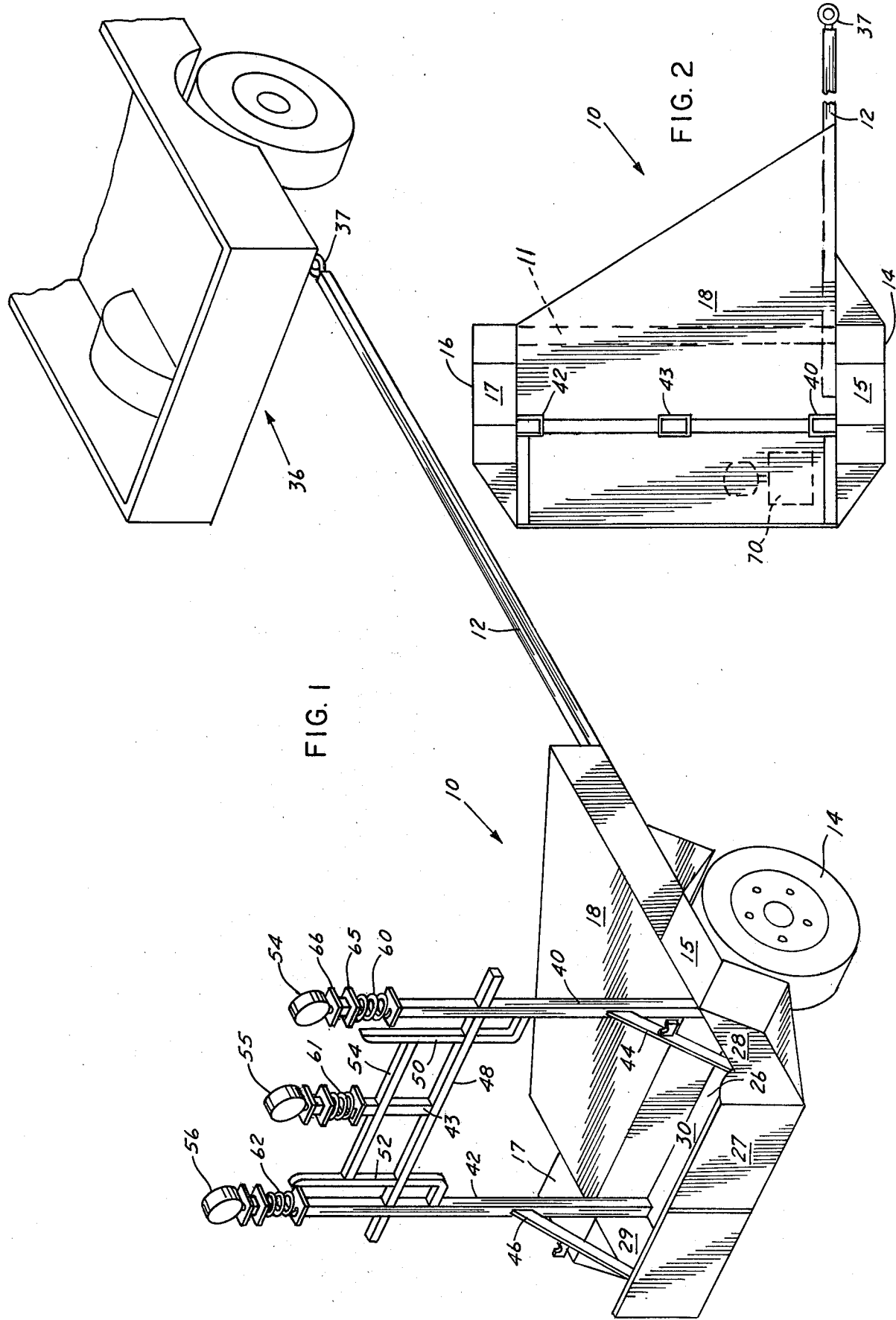

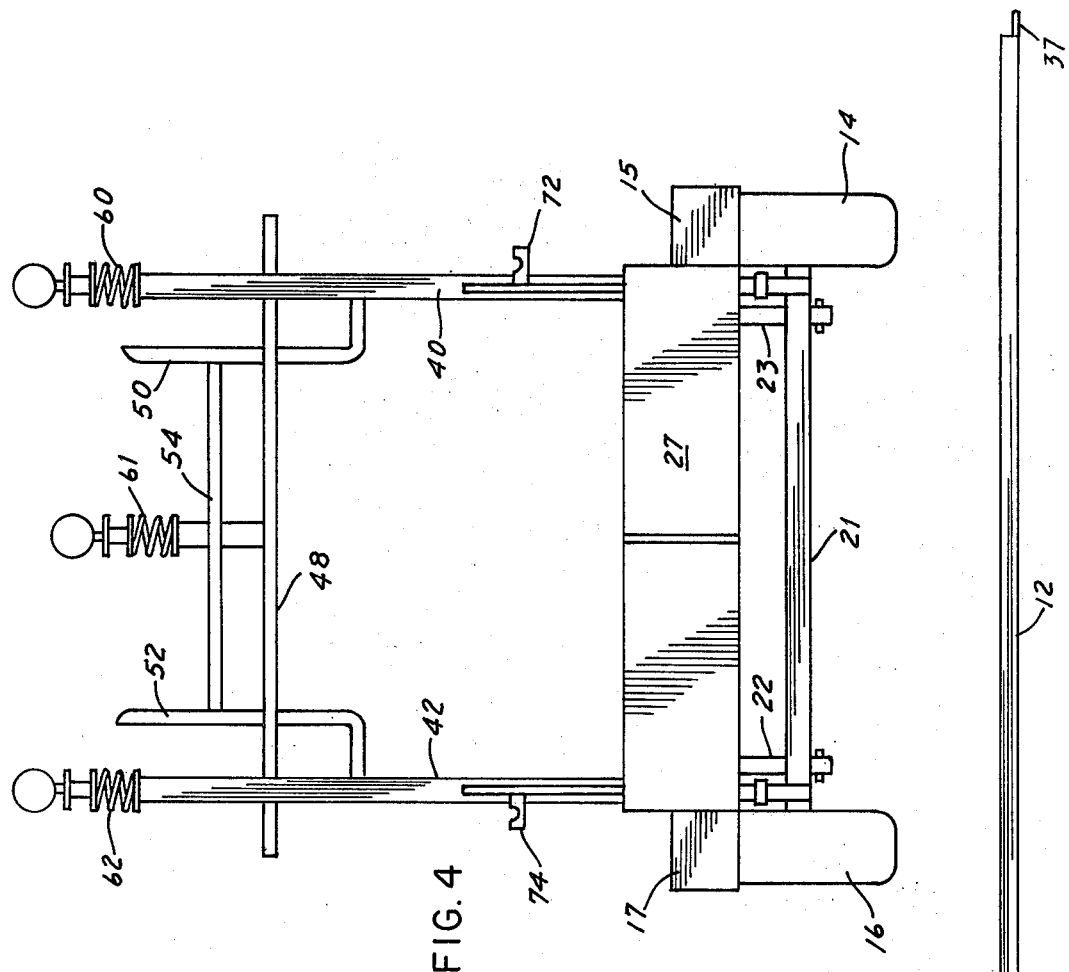
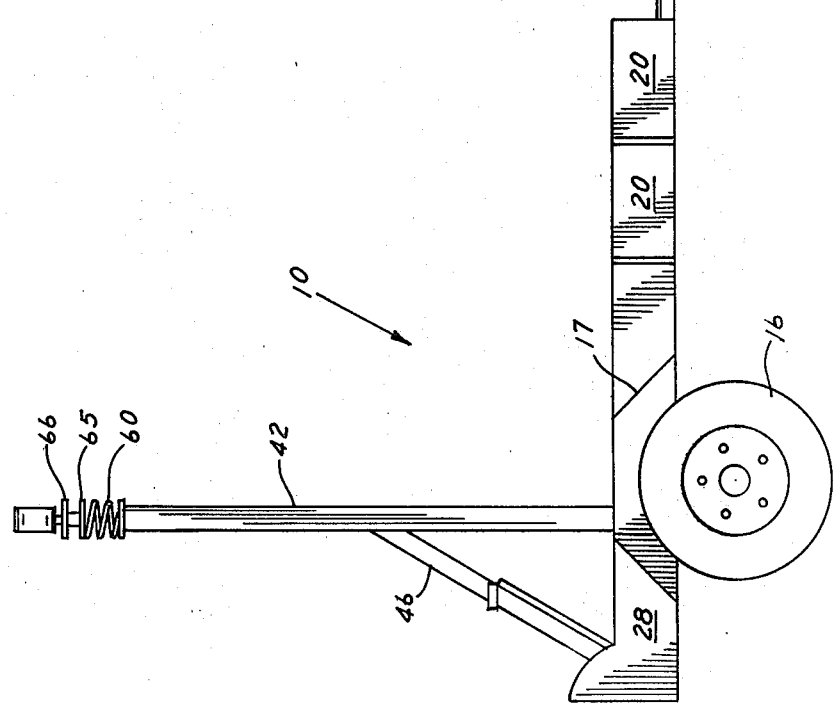

ROADWORKERS SAFETY TRAILER

This application is a continuation of application Ser. No. 34,150, filed Apr. 26, 1979, now abandoned.

This invention relates to trailers of the semi-trailer type, and more specifically to a workmen's trailer providing safety for workers engaged in in-road operations along with flowing traffic.

To maintain the smooth flow of vehicular traffic on a roadway during repair operations, depends in a substantial manner on the handling of the repair crews and equipment. Underground service lines normally have outlets, in the nature of manholes, in the roadway itself. Also, repair of the surface of the road requires detouring traffic during the repair operations. Vehicular traffic is a constant danger to workmen on all types of the repair gangs. On method of attempting to secure safety for the repair crews is to block one lane of traffic with brightly colored pylons (usually some 2½ to 3 feet high), while permitting traffic in the next adjacent land. This is, however, not satisfactory for all purposes, as, for example, a workman may accidently back into the flow of traffic in the lane adjacent the blocked off lane being repaired.

Many types of objects in a roadway require repairing, of course, producing hazards during such repair. Underground works, e.g. utility cables for electricity, telephone, water lines, sewer lines, etc. are approachable by manholes in the roadway. These manholes are covered by manhole covers for normal vehicle traffic. For repair, inspection or the like, the manhole cover is removed and underground operations proceed through the manhole. A number of worker's are usually necessary on the surface, and, of course, they are considered a traffic hazard. The workmen's truck or towed trailer is normally pulled up close to the manhole or road surface requiring repair, but the warning pylons placed in the traffic lane are relied on for safety. The pylons are, however, of limited safety aid because visibility easily knocked over, etc.

The present invention provides safety for road repair crews by a shielding trailer providing a secure area between trailer and two vehicle.

PRIOR ART

A central tongue service trailer in U.S. Pat. No. 3,734,540, uses an extensible tongue for the trailer (a two wheel semi-trailer type). The tongue of that trailer is extended for carrying utility poles, and the tongue is retracted for other travel.

The U.S. Pat. No. 4,017,200, Wood Jr. suggests an elaborate apparatus for shifting a highway lane divider by means of a short draw bar four wheel trailer. The trailer does not provide any secure area for workmen.

A shifting hitch for a tow truck is shown in U.S. Pat. No. 4,060,255 to permit hitching a trailer tongue to the tow truck hitch when the members are not in alignment, due to poor alignment by the backing tow vehicle. The unit has locks, for locking the hitch centerwise on the tow truck for hauling the trailer. The problem is to ease the hitching of a trailer to a tow vehicle.

THE INVENTION

The present invention provides a workmen's trailer (usually of the semi-trailer two wheel type) with a laterally offset tow bar or tongue, placed at one side of the trailer, and is attached to one side of the tow vehicle. The tow bar is of substantial length providing a secure area between the two vehicle and the trailer, with the tow bar normally adjacent the lane of flowing traffic. The trailer may be provided with storage means for hand tools and the like, and preferably is provided with a self contained warning light system. This latter may include a small gasoline engine driving a generator, and safety mounted lights. It has been found, by the actual testing of what may be considered a conventional sized trailer body, e.g. 8 feet by 8 feet, that the trailer tows well and directly behind the tow vehicle even at moderately high rates of speed.

OBJECTS AND ADVANTAGES OF THE INVENTION

Included among the objects and advantages of the invention is to provide a safety trailer for workers by providing a free, secure area between tow vehicle and trailer.

Another object of the invention is to provide a utility trailer with a tow bar adjacent the outer edge of one side of a trailer arranged for connection to a tow vehicle, side mounted hitch.

Another object of the invention is to provide a utility trailer with a long, side mounted tow bar providing a clear space in front of the trailer.

Still another object of the invention is to provide a two wheel workman's utility trailer arranged with a clear space in front of the trailer and storage means for workman's tools on the trailer.

Yet another object of the invention is to provide an inline tracking trailer, using a side mounted tow bar of substantial length holding the trailer a substantial distance from the tow vehicle.

An additional object of the invention is to provide a trailer with a self contained warning light system with safety mounted lights.

A further object of the invention is to provide a safety trailer and hitch assembly, having a self contained power source on the trailer for lights and small tools, and storage means for small tools as well as a safety cage for workmen.

These and other objects of the invention may be ascertained by reference to following description and appended drawings.

GENERAL DESCRIPTION OF THE ILLUSTRATIONS

FIG. 1 is a perspective view of a trailer, according to the invention, and a portion of a tow vehicle showing the position of the trailer draught or tow bar.

FIG. 2 is a top plan view of the trailer of FIG. 1.

FIG. 3 is a side elevational view of a modification of the trailer and tow bar according to the invention, and shows the tow bar mounted on the opposite side of the trailer from the embodiment of FIGS. 1 and 2, and FIG. 4 is a rear view of trailer of FIG. 1.

SPECIFIC DESCRIPTION OF THE ILLUSTRATIONS

In the drawings one preferred type of trailer is shown; however, it is intended that the concept of the design could be applied to other trailer designs without departing from the spirit thereof. A trailer, shown generally by number 10, includes a side mounted tow bar 12, which is secured to the longer side of trailer frame 11. The trailer frame 11 is only partly shown but obviously is intended to be a complete heavy duty frame with side, rear and front members, one of the side members being longer than the other. The tow bar and the longer side of the trailer frame 11 may be on either side of the trailer as the right side in FIG. 2 and the left side in FIG. 3. The draught or tow bar 12 is secured at one side adjacent to the longer side member of the trailer body, as has been mentioned. The trailer is of the semi-trailer type with two wheels 14 and 15, and a body covering 18, FIG. 2, extends over the members of the trailer frame. The body covering 18 cooperates with the members of the trailer frame 11 to make a box frame body, which in the embodiment of FIG. 3 has storage drawers 20. The wheels are top covered by fenders 15 and 17 attached to the box frame. The wheels 14 and 16 are mounted on an axle 21 that is connected with the box frame by a suspension system 22 and 23. The top covering 18 of the box frame is generally planar and level to provide means for temporarily supporting worker's tools. Referring to the embodiment of FIG. 1, the box frame includes an open storage box 26 formed with a back wall 27 (which may be split, side swinging tailgate), side walls 28 and 29 and a bottom 30. The box 26 provides additional, open top storage for the articles to be carried.

The draught or tow bar 12 extends forwardly from the longer side of the trailer box frame to a side mounted hitch 35 on a tow vehicle, shown generally as number 36. The tow vehicle may be a conventional pickup truck having a bed for carrying operations equipment or the like, or it may be of other types suitable for hauling light trailers. The tow vehicle must have a hitch compatable with the hitch portion of the tow bar. As shown, the tow bar has a ring 37 for attachment to a pintle hook or the like, or it may have a joint for a ball hitch, according to the desires of the designer. The tow bar is shown as a box construction, but may be any design.

In one effective size, the length of the trailer, from its rear end to the outer end of tow bar, is about 20 feet. With the maximum length of the trailer box at 8 feet, a working space of at least 12 feet long is provided. Since the front edge of the trailer box frame is angled from the front of the longer side of the trailer adjacent the tow bar, toward the front of the shorter side of the trailer and in front of the wheel 16, the work space is considerably decreased. Further, as will be appreciated from a study of FIGS. 1 and 2, the juncture of the angled front edge of the trailer box frame with the draught or tow bar 12 defines a fulcrum; when the trailer 10 is connected as in FIG. 1 and a car or other vehicle collides with the rear thereof and applies an impact force to the rear of the box frame, it will be apparent from the drawings that the box frame and the angled front edge thereof will direct the impact force toward the fulcrum. If the impact force is sufficient, it will also be apparent that its application to the fulcrum can cause the draught or tow bar 12 to bend about this fulcrum, and that when this occurs the movement of the box frame will tend to deflect the vehicle away from workmen protected by the trailer. The maximum width of an effective trailer is about 8 feet wide, from the outside of one wheel to the outside of the other. This design places the tow bar about 11 inches form the maximum outside edge of the trailer. The effective working area is, therefore, about 12 feet by 8 feet, guarded at one end by the trailer and at the other by the tow vehicle. The tow bar 12 being positioned at one side provides a side of the box frame barrier, leaving one side open for convenience of the workers. The body, being of box construction, may include the drawers for storage, shelves, compartments or the like as has been noted.

Further safety measures are provided in the form of warning lights mounted well above the body of the trailer for visibility. A pair of upright members 40 and 42 are supported by diagonal braces 44 and 46 respectively. Cross-member 48 spaces and supports the tops of the uprights, and a pair of inner uprights 50 and 52 are secured to short cross member 54. The inner uprights are secured to the main uprights 40 and 42 for support. Hooks, hangers or other tool carriers may be added to the upright frame work.

Warning lights, flashers or steady lights, 54 and 56 are mounted, respectively on the top of uprights 40 and 42. A central upright 43 extends upwardly from the cross members 48 and 54, and it supports warning light 55. Each warning light is mounted on a coil spring to prevent damage during towing, and operations. Thus, warning light 54 is mounted on spring 60 (a helical coil spring), light 55 is mounted on spring 61 and light 56 is mounted on spring 62. The light mount on each spring includes a spring cover plate (as 65 for light 54) and a lamp plate (66 for lamp 54) spaced thereabove. For a self sufficient trailer, an engine and generator may be provided, as the position of engine-generator 70 as indicated in the open compartment at the rear of the trailer. This permits the trailer to be unhitched from the tow vehicle and still have warning lights in operation.

The cross member 48 may be provided with extensions on the outside of the uprights providing a hanging storage space. Also, lower hooks 72 and 74 on the diagonals, FIG. 4, provide further hang storage space. The necessary travel lights for a trailer may be attached where desired, and these are normally operated by the electrical systems of the two vehicles. The rear wall or tail gate 27 may be a pivot down gate or a split gate opening sidewise for ease of access.

For using the trailer of the invention, the tow vehicle pulls the trailer to the point of operations, e.g. a manhole or the like, so that the space between the trailer and two vehicle is over the point of operation. The tow bar is preferably adjacent the lane of traffic to prevent workers from accidently backing into the traffic lane. The warning lights are actuated providing protection for the workers. In this position, the tool storage areas are easily available to the workers in the open area, so there is no need to walk around the trailer, and perhaps accidently enter into the open traffic lane.

The box construction provides a rigid trailer which trails in line with the tow vehicle. Proper trailing occurs in part because of the angled front of the box frame of the trailer 10, which in addition to directing the application of force to the draught or tow bar 12 functions to concentrate any loading placed on the box frame against the tow bar 12, as will be readily appreciated from the drawings. The construction is such that the unit corners essentially as a trailer of equivalent length with a central tow bar. The rigid, box construction of the trailer frame protects workmen, and helps assure the application of excessive collision impact forces to the fulcrum described earlier, as will be readily appreciated. If desired, the uprights holding the warning lights may be foldable so as to be flat when the trailer is not in use. Obviously, other trailer designs will occur to those skilled in the art, and such designs are intended within the scope of the invention.

What is claimed is:

1. A safety service trailer for towing by a towing vehicle and providing a protected work area for a plurality of road workmen to protect them from flowing vehicular traffic during work operations in a roadway, comprising:

heavy duty trailer frame means of roadable width and having transverse axle means mounted centrally therebeneath, said frame means including a pair of generally parallel side members, one of said side members being substantially longer than the other, a rear member extending between the rear ends of said side members generally at a right angle thereto, and an angled front member extending from the front of said longer side member to the front of the shorter side member;

wheel means mounted on said axle means on the outside of said trailer means for mobility of the trailer, the overall length of said trailer frame means being approximately equal to the overall width of said trailer measured between the outer sides of said wheel means;

covering means on said trailer frame means and forming therewith a box frame body, said covering means being secured to said side, rear and angled front members, and the front edge of said box frame body being angled back from the front of said longer side member toward the wheel means located on the other side of said frame means whereby the load carrying space on said covering means is concentrated toward said longer side member;

an elongated, single stretch draught bar having a substantial portion of the inner end thereof received within said box frame body, said draught bar being disposed to lie against and being secured to said longer frame side member, the outer end of said draught bar having means on the forward end thereof for connecting said trailer to a towing vehicle, and said draught bar projecting forward from said front edge of said one side of said box frame body a distance approximately equal to from one to one and one-half times the overall width of said trailer measured between the outer sides of said wheel means, the juncture of said angled front edge of said box frame body with said draught bar defining a fulcrum, the draught bar, said angled front edge of said box frame body, and the rear of a towing vehicle defining a clear protected working space for a plurality of workmen to do work on a roadway, said draught bar acting as a physical barrier to accidental movement of the workmen into the adjacent roadway, and said heavy duty trailer frame means, said box frame body, and said single stretch draught bar protecting the workers from the rear, and said box frame body and said angled front edge thereof functioning when said trailer is connected with a towing vehicle to direct toward said fulcrum forces acting upon said body because of a vehicle impacting the rear thereof, whereby when excessive impact force occurs said draught bar will bend at said fulcrum and said body will serve to protect the workmen, said body also then functioning to deflect the impacting vehicle away from said workmen; and upright frame means mounted on said trailer frame means and carrying thereon warning devices for signaling the presence of said trailer to oncoming vehicular traffic.

2. A safety service trailer as recited in claim 1, wherein said warning devices include warning lights.

3. A safety service trailer as recited in claim 1, wheren said box frame body has compartment means therein for carrying tools.

* * * * *